(12) United States Patent
Zhao et al.

(10) Patent No.: US 10,154,089 B2
(45) Date of Patent: Dec. 11, 2018

(54) DISTRIBUTED SYSTEM AND DATA OPERATION METHOD THEREOF

(71) Applicant: BEIJING QIHOO TECHNOLOGY COMPANY LIMITED, Xicheng, Beijing (CN)

(72) Inventors: Jianbo Zhao, Beijing (CN); Zhiqiang Wang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 756 days.

(21) Appl. No.: 14/368,560

(22) PCT Filed: Dec. 24, 2012

(86) PCT No.: PCT/CN2012/087313
§ 371 (c)(1),
(2) Date: Jun. 25, 2014

(87) PCT Pub. No.: WO2013/097674
PCT Pub. Date: Jul. 4, 2013

(65) Prior Publication Data
US 2015/0052214 A1    Feb. 19, 2015

(30) Foreign Application Priority Data
Dec. 28, 2011   (CN) .......................... 2011 1 0448281

(51) Int. Cl.
*H04L 29/08*    (2006.01)

(52) U.S. Cl.
CPC ...... *H04L 67/1097* (2013.01); *H04L 67/1008* (2013.01)

(58) Field of Classification Search
CPC .................. H04L 67/1008; H04L 67/1097
See application file for complete search history.

(56) References Cited

U.S. PATENT DOCUMENTS 6,029,230 A * 2/2000 Ng .................. G11B 15/6835
                                                711/158
6,952,737 B1 * 10/2005 Coates .................. G06F 3/0607
                                                707/E17.01

(Continued)

FOREIGN PATENT DOCUMENTS

WO       2010124024 A2   10/2010

OTHER PUBLICATIONS

English translation of Abstract only of Chinese Application No. CN101221517A, one page.

(Continued)

*Primary Examiner* — Uzma Alam
(74) *Attorney, Agent, or Firm* — Polsinelli PC

(57) ABSTRACT

The present invention discloses a distributed system and a data operation method thereof. The system comprises a client, a master node, a plurality of storage nodes and a plurality of computing nodes. The client is configured to send a data operation request to the master node. The master node is configured to respond to the client's request, acquire a storage node list, and then send the storage node list to the client. The plurality of storage nodes are configured to store data requested by the client for operation. The plurality of computing nodes are configured to execute a computing task allocated by the master node based on the client's data operation request. For acquiring the storage node list, the master node employs a copy location selection policy to select a storage node corresponding to a data copy. The copy location selection policy comprises at least one of the following manners: selecting a storage node with a low storage load, selecting a computing node with a low computing load, and selecting a storage node with a poor locality.

12 Claims, 2 Drawing Sheets

(56) References Cited

U.S. PATENT DOCUMENTS

| | | | |
|---|---|---|---|
| 8,250,283 B1* | 8/2012 | Lee | G06F 3/0604 711/100 |
| 8,560,639 B2* | 10/2013 | Murphy | G06F 11/1446 707/610 |
| 9,454,444 B1* | 9/2016 | Agarwal | G06F 11/2023 |
| 2004/0148461 A1* | 7/2004 | Steinmetz | G06F 3/0607 711/114 |
| 2005/0015430 A1* | 1/2005 | Rothman | G06F 9/5011 709/201 |
| 2005/0204078 A1* | 9/2005 | Steinmetz | G06F 3/0611 710/38 |
| 2008/0140469 A1* | 6/2008 | Iqbal | G06Q 10/04 705/7.37 |
| 2008/0201336 A1* | 8/2008 | Yamato | G06F 17/30067 |
| 2009/0089303 A1* | 4/2009 | Slik | G16H 10/60 |
| 2009/0164742 A1* | 6/2009 | Wach | G06F 11/2084 711/162 |
| 2010/0011003 A1* | 1/2010 | Carver | H04L 67/06 707/E17.01 |
| 2010/0011364 A1* | 1/2010 | Gerovac | G06F 9/5011 718/104 |
| 2011/0299534 A1* | 12/2011 | Koganti | H04L 12/4625 370/392 |
| 2012/0084383 A1* | 4/2012 | Bernbo | G06F 17/30215 709/213 |
| 2012/0166394 A1* | 6/2012 | Kim | G06F 17/30212 707/634 |
| 2012/0166403 A1* | 6/2012 | Kim | G06F 17/30156 707/692 |
| 2012/0209943 A1* | 8/2012 | Jung | G06F 15/161 709/213 |
| 2012/0239730 A1* | 9/2012 | Revanuru | G06F 17/30286 709/203 |
| 2012/0317249 A1* | 12/2012 | Salsburg | G06F 9/5072 709/220 |
| 2013/0151680 A1* | 6/2013 | Salinas | G06F 17/30557 709/223 |
| 2013/0286579 A1* | 10/2013 | De Spiegeleer | G06F 11/3034 361/679.33 |
| 2014/0344532 A1* | 11/2014 | Lazier | G06F 3/0616 711/154 |

OTHER PUBLICATIONS

English translation of Abstract only of Chinese Application No. CN101370030A, one page.

English translation of Abstract only of Chinese Application No. CN102111438A, one page.

International Search Report regarding PCT/CN2012/087313 dated Mar. 14, 2013, 4 pages.

\* cited by examiner

DISTRIBUTED SYSTEM AND DATA OPERATION METHOD THEREOF

FIELD OF THE INVENTION

The present invention relates to the field of computer technology, and in particular to a method of obtaining a storage node corresponding to a copy for accessing the copy in a distributed system and a distributed system using this method.

BACKGROUND OF THE INVENTION

A distributed file system is a distributed storage system for building local storage based on computer storage nodes. As compared with traditional storage systems, the distributed file system has advantages such as a high storage cost-effectiveness and strong expandability.

Current distributed file systems usually are composed of a metadata node and multiple storage nodes, wherein the metadata node is used for storing data block situations of each file, names of storages nodes where respective data blocks lie, and information of data blocks included by each storage node and so on. The storage nodes are used to store actual data blocks, and usually the size of each data block is 64 MB or 128 MB. The storage nodes will regularly send the locally stored data blocks to the metadata node to enable the metadata node to sense data storage locations of all files in the distributed file system. When a client needs to perform data accessing operation to the above distributed file system, it first acquires or establishes the positions of the data blocks of the file from the metadata node, and then directly communicates with the storage nodes where the corresponding data blocks lie to perform operations such as reading or writing data blocks.

For the current distributed file system, it usually stores the data blocks with a plurality of copies in order to improve system reliability and data availability. For example, three or more copies may be stored for the same data block at different storage nodes, wherein each copy is stored at one storage node. As such, the content of each file is stored at a plurality of storage nodes. Once an individual storage node breaks down, data of the whole file still can be acquired from the storage nodes storing other copies of the file.

When the client needs to write a file into the distributed file system, the client first communicates with the metadata node to acquire from the metadata node the positions of the blocks corresponding to the file, namely, a list of storage nodes storing the blocks corresponding to the file. The storage node list indicates that the same copy of data needs to be written into different storage nodes, i.e., the same copy of data has a plurality of copies at different storage nodes. Then the client selects, from the returned storage node list, the closest storage node in respect of the network address, writes the data into the storage node, and meanwhile informs the storage node which storage nodes the copy of data also needs to be written into. After that the storage node repeats the above storage procedure until all storage nodes in the storage node list accomplish storage.

SUMMARY OF THE INVENTION

In view of the above problems, the present invention is proposed to provide a distributed system and its data operation method, which overcome the above problems or at least in part solve or relieve the above problems.

According to an aspect of the present invention, there is provided a distributed system, comprising:

a client configured to send a data operation request to a master node, a master node configured to, in response to the client's request, acquire a storage node list, and send the storage node list to the client;

a plurality of storage nodes configured to store data requested by the client for operation;

a plurality of computing nodes configured to execute a computing task allocated by the master node based on the client's data operation request;

wherein for acquiring the storage node list, the master node employs a copy location selection policy to select a storage node corresponding to a data copy; and the copy location selection policy comprises at least one of the following manners: selecting a storage node with a low storage load, selecting a computing node with a low computing load, and selecting a storage node with a poor locality.

According to another aspect of the present invention, there is provided a data operation method in a distributed system, comprising:

sending a data operation request by a client to a master node;

acquiring a storage node list by a master node in response to the client's request, and sending the storage node list to the client;

wherein for acquiring the storage node list, the master node employs a copy location selection policy to select a storage node corresponding to a data copy; and the copy location selection policy comprises at least one of the following manners: selecting a storage node with a low storage load, selecting a computing node with a low computing load, and selecting a storage node with a poor locality.

For acquiring the storage node list, the master node employs the copy location selection policy based on metadata information of the distributed system stored in the master node.

According to still another aspect of the present invention, there is provided a computer program comprising a computer readable code, which causes a server to execute the data operation method in the distributed system as claimed in any of claims 11-19 when the computer readable code is running on the server.

According to a further aspect of the present invention, there is provided a computer readable medium storing therein a computer program as claimed in claim 20.

The beneficial effects of the present invention lie in that:

A computing efficiency is optimized to a certain degree, the overall computing task locality of the cluster is increased, and the overall computing load of the cluster is made evener, and the storage load of all storage nodes in the cluster is made evener.

The above description is only an overview of technical solutions of the present invention. In order to more clearly understand the technical means of the invention so as to implement it according to the content of the specification, and to make the above and other objects, features and advantages of the invention more apparent, the embodiments of the invention will be illustrated in the following.

BRIEF DESCRIPTION OF THE DRAWINGS

Other various advantages and benefits will become apparent to those having ordinary skills in the art by reading the following detailed description of the preferred embodiments. The drawings are only intended to illustrate the preferred embodiments, and not to limit the present invention. And throughout the drawings, the same reference signs are used to denote the same components. In the drawings.

DETAILED DESCRIPTION OF THE INVENTION

In the following the present invention will be further described with reference to the drawings and specific embodiments.

In the procedure of reading or writing a file in the distributed file system, it involves a storage node selection policy, namely, how to select out a list of storage nodes for storing copies. The storage node selection policy for implementing copy storage in the current distributed file system is relatively simple and mainly considers the storage reliability. When a client and a certain storage node are on the same machine, the storage node for the first copy is that storage node of the machine where the writing client lies. After the operation lasts a period of time, the storage load of the storage node will be much higher than those of other storage nodes, which causes imbalance of overall load of the distributed file system.

Besides, the procedure of reading or writing a file in the current distributed file system does not consider computing load of the machine where the storage node lies and locality of computing task, wherein the computing load indicates the number of computing tasks run by computing nodes on the machine where the storage nodes lie. The computing task locality indicates whether the data accessed by the computing tasks are in the storage nodes of the same machine. If the computation and data are on the same machine, this indicates that the computing task has a good locality.

Since the current distributed file system does not consider node locality, computing load and storage load upon file accessing operations, it has drawbacks such as imbalance of storage load and undesirable computing efficiency. Therefore, a technical problem urgently to be addressed by those skilled in the art is to propose a new distributed system, wherein a new storage node selection policy is employed upon selecting storage nodes corresponding to the copies, to overcome the above drawbacks.

Figure 1:
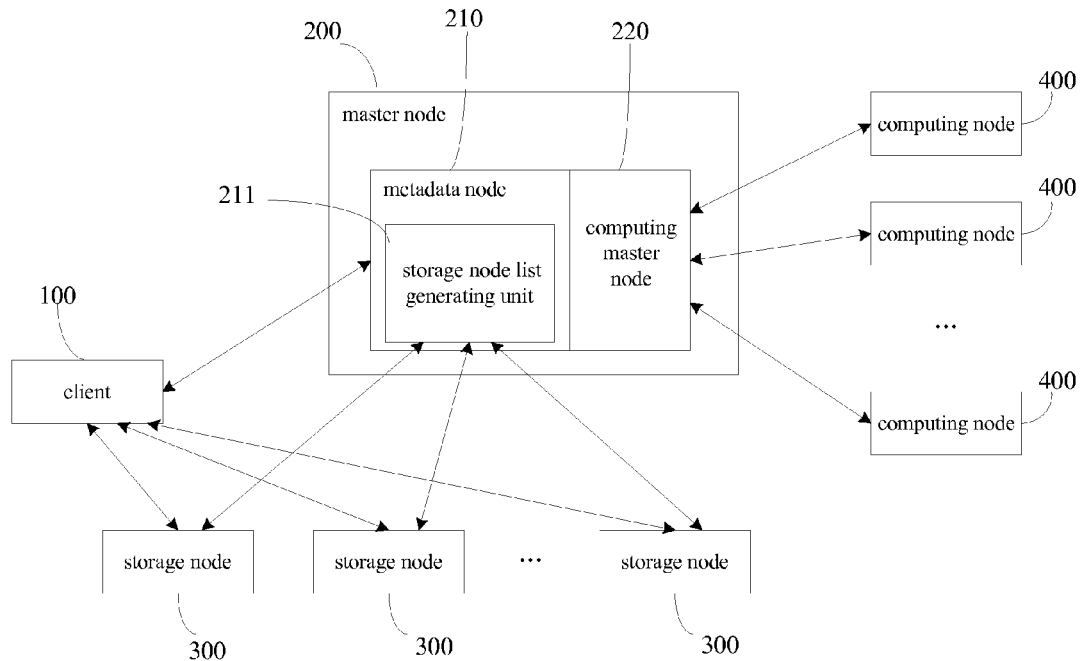
FIG. 1 is a structural schematic view of a distributed system according to an embodiment of the present invention.

In view of the above problems, the present embodiment provides a distributed system, as shown in FIG. 1. FIG. 1 is an exemplary representation of the distributed system of the present embodiment. Those skilled in the art can obtain other variant embodiments according to the following depictions. The system comprises a client 100, a metadata node 210, a computing master node 220, a plurality of storage nodes 300, and a plurality of computing nodes 400, wherein the metadata node 210 and the plurality of storage nodes 300 constitute the distributed file system, and the computing master node 220 and the plurality of computing nodes 400 constitute a distributed computing system. The distributed computing system provides computing support for the distributed file system.

The client sends an operation request such as reading or writing to the metadata node and acquires a storage node list corresponding to data for this operation from the metadata node, wherein the data for this operation comprise data blocks to be stored or copies of data blocks stored in the plurality of storage nodes. The client executes this data operation at the corresponding storage nodes according to the acquired storage node list.

The storage nodes are used to store file content in the distributed file system. Files in the distributed file system are divided into data blocks and stored, for example, each data block is sized to be 64 MB or 128 MB. In order to prevent data loss due to breakdown of the machine, a data block is usually stored in a plurality of storage nodes as a plurality of data block copies. The storage nodes will periodically send the locally stored data blocks to the metadata node to enable the metadata node to sense data storage locations of all files in the file system.

The metadata node is used to maintain metadata information of all files in the distributed file system, and the metadata information includes: file access right, host, and data storage location of files. The metadata node periodically acquires the metadata information of both the storage nodes and the stored data thereof from the storage nodes, and generates a storage node list according to the metadata information based on the client's request. The storage node list indicates different storage nodes that the same data shall be corresponding to.

The computing master node, in response to the client's task request, performs initialization, division and allocation of the computing tasks, and traces running status of all computing tasks to obtain computing task load situations of the computing nodes and the locality information of the computing tasks of the computing nodes. The computing master node may serve as an independent device, or constitutes the master node 200 together with the metadata node.

The computing nodes are used to execute the computing tasks allocated by the master node, and meanwhile stores a status of the computing tasks executed on the computing nodes. The computing nodes periodically report their own status to the computing master node, including load situations of the computing tasks of the computing nodes, and also add the locality information of computing tasks of the computing nodes to the information to be reported. One computing node may be configured independent of one storage node, also may be deployed with one storage node in one machine. If the storage node and the computing node are deployed on the same machine, the computing master node will, upon allocating tasks, will preferentially allocate computing tasks to the computing nodes corresponding to those storage nodes where data to be processed by the computing tasks lie. As such, the computing tasks have good locality and may reduce consumption of network data transmission.

The metadata node comprises a storage node list generating unit 211 configured to generate a storage node list corresponding to the present reading or writing operation. During the generating of the storage node list, the storage node list generating unit will apply a copy location selection policy according to the current status of the distributed file system. The current status of the distributed system comprises metadata information in the metadata node and information of the computing nodes traced by the computing master node. Specifically, the copy location selection policy needs to comprehensively consider the storage load of the storage nodes, the computing load of the computing nodes and locality of the computing tasks, and preferably selects storage nodes with a low storage load, a low computing load and a poor locality. The several situations will be described in detail below.

The computing master node preferentially initiates the computing task according to locality of input data of the computing tasks, namely, preferentially run the computing tasks on the machine of the storage nodes where the input data lie. Based on this property, upon selecting storage nodes to store the copies, it can be considered that a storage node at a computing node with a poor locality of computing task is preferably selected as a copy storage location of the newly-written data. As such, when the computing task with this portion of data as input data is executed subsequently, it is very probable to preferentially initiate execution of the computing task at the computing nodes of this machine. As such, the computing task locality of the whole cluster might increase, whereby a high-efficient computation is achieved.

On the other hand, the storage nodes (copy storage locations) may be selected by considering the current load information of computing nodes on the same machine. Whenever the storage node is selected, the storage node on the machine where the computing node with lower computing load lies may be selected. As such, when the computing task with this portion of data as input data is executed subsequently, it is very probable to preferentially initiate execution of the computing task at the computing nodes on this machine, thereby providing the load balance of the overall cluster.

Finally, the selecting of the storage nodes (copy locations) may also consider the current storage load situations of the nodes. Otherwise, it is probably that the storage load of an individual node is very much higher than the storage loads of other storage nodes. For example, if a writing client and a certain storage node are on the same machine, the storage node for the first copy is always that storage node of the machine where the writing client lies. After the writing operation lasts a period of time, the storage load of the machine where the storage node lies will be much higher than the storage loads where other storage nodes lie.

Therefore, to sum up the above three aspects, when writing new data, the storage node selection policy should, on the basis of the original, consider the computing task locality on the computing node, computing load situations of the computing node and the storage load situation of the machine where the storage node lies.

In the distributed system described above, the computing master node and the plurality of computing nodes may serve as a distributed computing system, which may be either affiliated to the distributed file system, or configured as an independent system, and which assists in executing the computation of the user-requested task during the running of the distributed file system.

A method of selecting a storage node corresponding to a copy during access of a file based on the above-mentioned distributed system will be described below.

Figure 2:
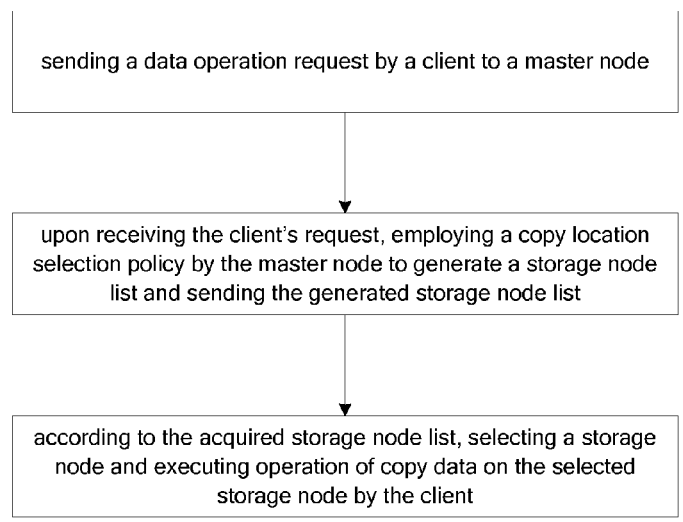
FIG. 2 is a flow chart for data operation of the distributed system according to an embodiment of the present invention.

Referring to FIG. 2, first, the client sends a request of data operation to the metadata node. Then, after receiving the request sent by the client, the metadata node, based on metadata information stored therein and computing node status information sent to it by the computing master nodes, applies the copy location selection policy to generate a storage node list. The copy location selection policy comprises at least one of the following manners: selecting a storage node with a low storage load, selecting a storage node on a machine where a computing node with a low computing load lies, and selecting a storage node on a machine where a computing node with a poor locality lies. The metadata node sends the generated storage node list to the client. The client selects the storage nodes according to the acquired storage node list, and executes operation to the copies of the data at the selected storage node.

A method of selecting copy locations included in the storage node list on the basis of employing the above copy location selecting policy will be further described below.

When selecting the storage node of the first copy, first, judgment is made as to whether the writer is in a cluster, wherein the writer may be a client. If the writer is not in any cluster, a storage node will be selected by employing the copy location selection policy in a global scope. If the writer is in a cluster, the storage node where the writer lies will be selected. Before selecting the storage node where the writer lies, preferably, the storage load of the storage node is further considered. If the storage node is inappropriate, a storage node at the same rack with the writer will be selected by employing the copy location selection policy. A combination of a distributed file system and a distributed computing system form a cluster which comprises a plurality of servers distributed on a plurality of racks, with each rack being provided with a plurality of servers. If a power source of one rack goes wrong, the servers on the whole rack will be subjected to power failure. Therefore, the copies need to be placed on different racks to enhance reliability.

Furthermore, a storage node may be selected for the second copy. The copy location selection policy is employed to select a storage node at a rack different from the rack where the storage node for the first copy lies. If the selection fails, the copy location selection policy is employed to select a storage node at the rack where the storage node for the first copy lies.

Furthermore, a storage node may be selected for the third copy. If the storage node where the first copy lies and the storage node where the second copy lies are at the same rack, the copy location selection policy is employed to select a storage node at a rack different from the rack where the storage node for the first copy lies. Otherwise, the copy location selection policy is employed to select a storage node at the rack where the storage node for the second copy lies.

Furthermore, more storage nodes for more copies are selected by directly employing the copy location selection policy within the scope of the whole cluster.

After the locality of the computing tasks of the computing nodes, the load of the computing tasks of the computing nodes and the storage load of the storage nodes are considered when selecting the storage nodes of the storage copies, computing efficiency may be theoretically optimized to a certain degree. Since the new data are placed on the machine with poor locality of the computing tasks and lower computing load, the computing master node will preferentially considers these data as the input source and schedules the calculation to be performed on the computing nodes of the machine where these storage nodes lie. Thus, the overall computing task locality of the cluster may be increased, and the overall computing load of the cluster is made evener. Besides, the selection policy of the storage nodes considers the storage load situations of the storage nodes, which makes the storage load of all storage nodes in the cluster evener.

Each embodiment regarding parts in the present invention may be implemented in hardware, or implemented by one or more software modules running on a processor, or implemented in their combinations. It should be understood for those skilled in the art that a microprocessor or digital signal processor (DSP) may be used in practice to implement a part or all of the functions of a part or all of the components of the distributed system according to embodiments of the present invention. The present invention may be further implemented as an apparatus or a device program (e.g., a computer program and a computer program product) for executing a part or all of the methods described herein. Such a program implementing the present invention may be stored on a computer-readable medium, or may be in the form of one or more signals. Such a signal can be obtained by downloading it from the Internet website, or provided on a carrier signal or provided in any other form.

Figure 3:
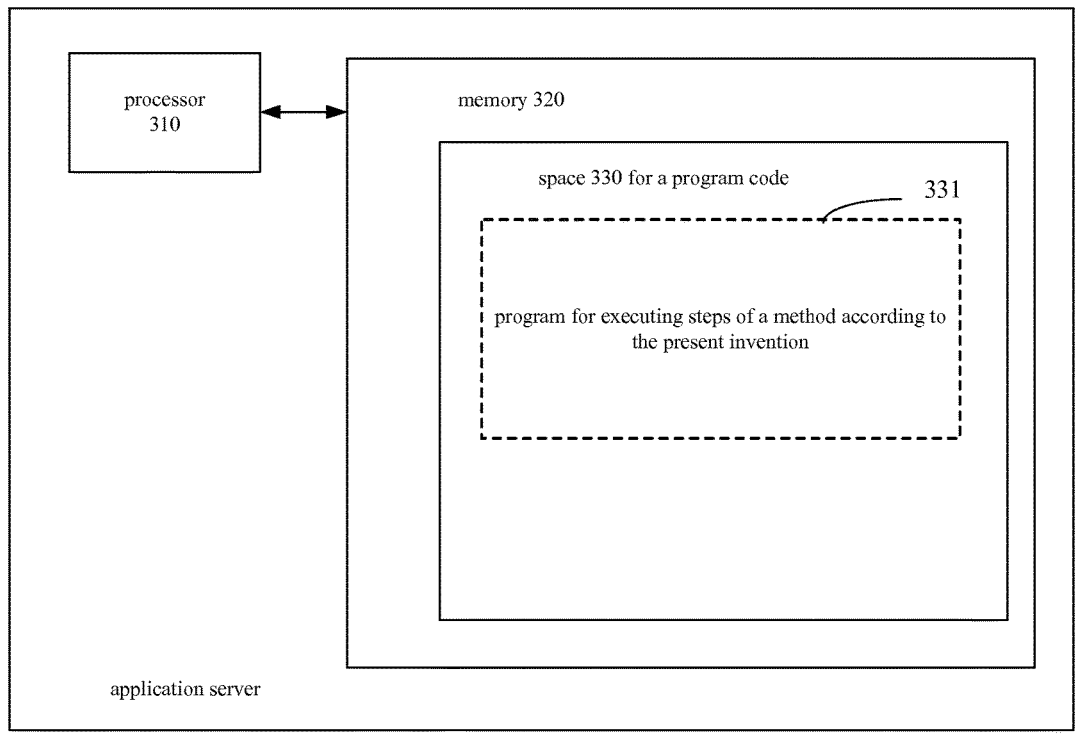
FIG. 3 shows schematically a block diagram of a server for executing the method according to the present invention.
Figure 4:
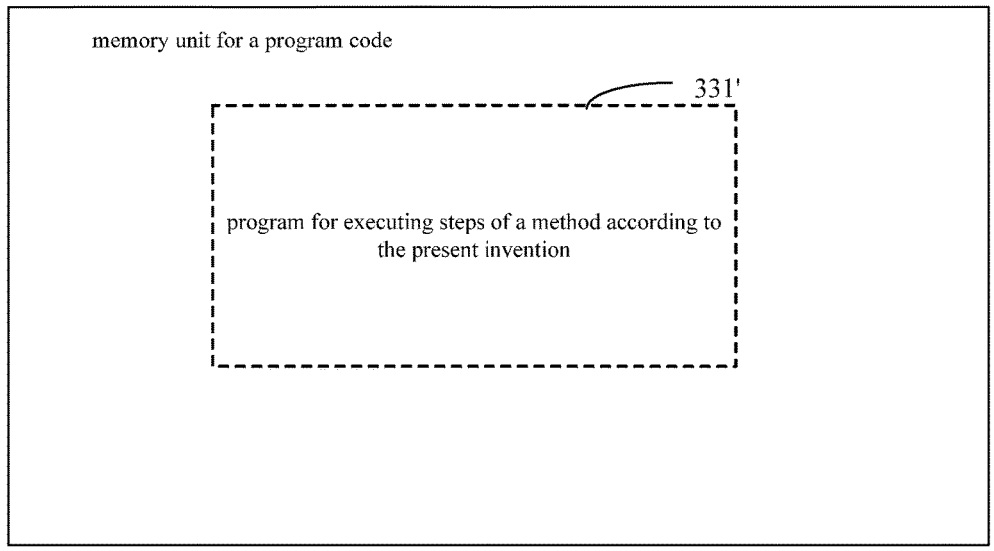
FIG. 4 shows schematically a storage unit for maintaining or carrying a program code for implementing the method according to the present invention.

For example, FIG. 3 show a server which may carry out the data operation method of the distributed system according to the present invention, e.g., an application server. The server traditionally comprises a processor 310 and a computer program product or computer-readable medium in the form of a memory 320. The memory 320 may be an electronic memory such as a flash memory, an EEPROM (Electrically Erasable Programmable Read-Only Memory), an EPROM, a hard disk or a ROM. The memory 320 has a memory space 330 for a program code 331 for executing any method step of any one of the methods as describes above. For example, the memory space 330 for a program code may comprise individual program codes 331 for carrying out individual steps in the above methods respectively. These program codes may be read out from or written to one or more computer program products. These computer program products comprise such a program code carriers as a hard disk, a compact disk (CD), a memory card or a floppy disk. Such a computer program products is generally a portable or stationary storage unit as shown with reference to FIG. 4. The storage unit may have a memory segment, a memory space etc., arranged similarly to the memory 320 on the server of FIG. 3. The program code may for example be compressed in an appropriate form. In general, the storage unit comprises a computer-readable code 331', i.e., a code which may be read by e.g., a processor such as 310, and when run by a server, the codes cause the server to execute individual steps in the methods described above.

"One embodiment", "an embodiment", or "one or more embodiments" mentioned herein implies that a particular feature, structure, or characteristic described in connection with the embodiments is included in at least one embodiment of the invention. In addition, it is to be noted that, examples of a phrase "in an embodiment" herein do not necessarily all refer to one and the same embodiment.

In the specification provided herein, a plenty of specific details are described. However, it can be appreciated that embodiments of the present invention may be practiced without these specific details. In some embodiments, in order to understand the present description without confusions, methods, structures and technologies well known in the art are not specified in detail.

It should be noted that the above embodiments are intended to illustrate but not to limit the present invention, and those skilled in the art may design alternative embodiments without departing from the scope of the appended claims. In the claims, any reference signs placed between the parentheses should not be construed as limiting to the claims. The word "comprising" does not exclude the presence of an element or a step not listed in a claim. The word "a" or "an" preceding an element does not exclude the presence of a plurality of such elements. The present invention may be implemented by virtue of hardware comprising several distinct elements and by virtue of a properly-programmed computer. In claims enumerating several units of a device, several of these units can be embodied by one and the same hardware item. The usage of the words such as first, second and third does not mean any ordering. Such words may be construed as naming.

In addition, it should also be noted that the language used in the specification is selected mainly for the purpose of readability and teaching, but not selected for explaining or defining the subject matter of the invention. Therefore, for those of ordinary skilled in the art, many modifications and variations are apparent without departing the scope and spirit of the appended claims. The disclosure of the present invention is intended to be illustrative, but not limiting, of the scope of the invention, which is set forth in the claims.

What is claimed is:

1. A distributed system, comprising:
a client having at least one processor to send a data operation request of writing data to a master node;
the master node having at least one processor to, in response to the request of the client, generate a storage node list and send the storage node list to the client;
a plurality of storage nodes to store data requested by the client for operation; and
a plurality of computing nodes having at least one processor to perform a computing task allocated by the master node based on the data operation request of the client;
wherein generating the storage node list comprises selecting location information of a corresponding storage node for a first copy of the data, location information for a second copy of the data, and location information for a third copy of the data;
the location information of the first copy is obtained by:
determining whether the client is in a cluster;
if the client is not in any cluster, selecting a storage node by employing a copy location selection policy in a global scope, and if the client is in a cluster, selecting a storage node where the client lies, wherein the copy location selection policy comprises at least one of the following:
selecting a storage node with a low storage load, selecting a computing node with a low computing load, and selecting a computing node associated with a storage node, the computing node located on a first machine and the storage node located on a second machine different from the first machine;
the location information of the second copy is obtained by:
employing the copy location selection policy to select a storage node at a rack different from a rack where the storage node for the first copy lies, and
if the selection fails, employing the copy location selection policy to select a storage node at the rack where the storage node for the first copy lies, wherein the copy location selection policy comprises at least one of the following:
selecting a storage node with a low storage load, selecting a computing node with a low computing load, and selecting a computing node associated with a storage node, the computing node located on a first machine and the storage node located on a second machine different from the first machine; and
the location information of the third copy is obtained by:
if the storage node where the first copy lies and the storage node where the second copy lies are at a same rack, employing the copy location selection policy to select a storage node at a rack different from the rack where the storage node for the first copy lies; otherwise, employing the copy location selection policy to select a storage node at the rack where the storage node for the second copy lies, wherein the copy location selection policy comprises at least one of the following: selecting a storage node with a low storage load, selecting a computing node with a low computing load, and selecting a computing node associated with a storage node, the computing node located on a first machine and the storage node located on a second machine different from the first machine; and executing, by the client, the data operation at the corresponding storage node for the first copy, the second copy and the third copy according to the acquired storage node list.

2. The system according to claim 1, wherein when acquiring the storage node list, the master node employs the copy location selection policy based on metadata information of the distributed system stored in the master node.

3. The system according to claim 2, wherein the metadata information of the distributed system comprises status information of storage nodes and/or status information of computing nodes.

4. The system according to claim 1, wherein before selecting the storage node where the client lies, the storage load of the storage node is further considered, and if the storage node is inappropriate, a storage node at the same rack with the client is selected by employing the copy location selection policy.

5. The system according to claim 1, wherein the storage node list further comprises location information of a further copy more than the first copy, the second copy, and the third copy which is obtained by: employing the copy location selection policy to select a storage node in a scope of the whole cluster.

6. The system according to claim 1, wherein the storage nodes and the computing nodes are placed separately, or placed in one machine in a one-to-one manner.

7. A data operation method in a distributed system comprising:
sending a data operation request of writing data to a master node;
generating a storage node list by the master node in response to the request of the client and sending the storage node list to the client;
wherein generating the storage node list comprises selecting location information of a corresponding storage node for a first copy of the data, location information for a second copy of the data, and location information for a third copy of the data;
the location information of the first copy is obtained by:
determining whether the client is in a cluster;
if the client is not in any cluster, selecting a storage node by employing a copy location selection policy in a global scope, and if the client is in a cluster, selecting a storage node where the client lies, wherein the copy location selection policy comprises at least one of the following:
selecting a storage node with a low storage load, selecting a computing node with a low computing load, and selecting a computing node associated with a storage node, the computing node located on a first machine and the storage node located on a second machine different from the first machine;
the location information of the second copy is obtained by:
employing the copy location selection policy to select a storage node at a rack different from a rack where the storage node for the first copy lies, and
if the selection fails, employing the copy location selection policy to select a storage node at the rack where the storage node for the first copy lies, wherein the copy location selection policy comprises at least one of the following:
selecting a storage node with a low storage load, selecting a computing node with a low computing load, and selecting a computing node associated with a storage node, the computing node located on a first machine and the storage node located on a second machine different from the first machine; and
the location information of the third copy is obtained by:
if the storage node where the first copy lies and the storage node where the second copy lies are at a same rack, employing the copy location selection policy to select a storage node at a rack different from the rack where the storage node for the first copy lies; otherwise, employing the copy location selection policy to select a storage node at the rack where the storage node for the second copy lies, wherein the copy location selection policy comprises at least one of the following: selecting a storage node with a low storage load, selecting a computing node with a low computing load, and selecting a computing node associated with a storage node, the computing node located on a first machine and the storage node located on a second machine different from the first machine; and
executing, by the client, the data operation at the corresponding storage node for the first copy, the second copy and the third copy according to the acquired storage node list.

8. The method according to claim 7, wherein for acquiring the storage node list, the master node employs the copy location selection policy based on metadata information of the distributed system stored in the master node.

9. The method according to claim 8, wherein the metadata information of the distributed system comprises status information of storage nodes and/or state information of computing nodes.

10. The method according to claim 7, wherein before selecting the storage node where the client lies, the storage load of the storage node is further considered, and if the storage node is inappropriate, a storage node at the same rack with the client is selected by employing the copy location selection policy.

11. The method according to claim 7, wherein the storage node list further comprises location information of a further copy more than the first copy, the second copy, and the third copy obtained by employing the copy location selection policy to select a storage node in a scope of the whole cluster.

12. A non-transitory computer readable storage medium having instructions stored thereon that, when executed by a server, cause the server in a distributed system to perform the data operations comprising:
sending a data operation request of writing data to a master node;
generating a storage node list by the master node in response to the request of the client and sending the storage node list to the client;
wherein generating the storage node list comprises selecting location information of a corresponding storage node for a first copy of the data, location information for a second copy of the data, and location information for a third copy of the data;

the location information of the first copy is obtained by:

determining whether the client is in a cluster;

if the client is not in any cluster, selecting a storage node by employing a copy location selection policy in a global scope, and if the client is in a cluster, selecting a storage node where the client lies, wherein the copy location selection policy comprises at least one of the following:

selecting a storage node with a low storage load, selecting a computing node with a low computing load, and selecting a computing node associated with a storage node, the computing node located on a first machine and the storage node located on a second machine different from the first machine;

the location information of the second copy is obtained by:

employing the copy location selection policy to select a storage node at a rack different from a rack where the storage node for the first copy lies, and if the selection fails, employing the copy location selection policy to select a storage node at the rack where the storage node for the first copy lies, wherein the copy location selection policy comprises at least one of the following:

selecting a storage node with a low storage load, selecting a computing node with a low computing load, and selecting a computing node associated with a storage node, the computing node located on a first machine and the storage node located on a second machine different from the first machine; and the location information of the third copy is obtained by:

if the storage node where the first copy lies and the storage node where the second copy lies are at a same rack, employing the copy location selection policy to select a storage node at a rack different from the rack where the storage node for the first copy lies; otherwise, employing the copy location selection policy to select a storage node at the rack where the storage node for the second copy lies, wherein the copy location selection policy comprises at least one of the following: selecting a storage node with a low storage load, selecting a computing node with a low computing load, and selecting a computing node associated with a storage node, the computing node located on a first machine and the storage node located on a second machine different from the first machine; and executing, by the client, the data operation at the corresponding storage node for the first copy, the second copy and the third copy according to the acquired storage node list.

* * * * *